US012698755B2

(12) United States Patent
Schnehle et al.

(10) Patent No.: US 12,698,755 B2
(45) Date of Patent: Aug. 4, 2026

(54) CONTROL OF A WIND TURBINE BASED ON PREDICTING AMPLITUDE MODULATION (AM) NOISE

(71) Applicant: VESTAS WIND SYSTEMS A/S, Aarhus N (DK)

(72) Inventors: Helge Schnehle, Flensburg (DE); Erik Sloth, Rønde (DK); Daniel Merchan Millan, Matosinhos (PT); Naga Srinivas Kamarajugadda, Visakhapatnam (IN); Ulf Clausen, Husum (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/500,522

(22) Filed: Nov. 2, 2023

(65) Prior Publication Data

US 2024/0141869 A1     May 2, 2024

(30) Foreign Application Priority Data

Nov. 2, 2022    (IN) .............................. 202211062574
Dec. 15, 2022    (EP) ..................................... 22213673

(51) Int. Cl.
*F03D 7/02*        (2006.01)
*F03D 7/04*        (2006.01)
*F03D 17/00*       (2016.01)

(52) U.S. Cl.
CPC ........... *F03D 7/0296* (2013.01); *F03D 7/028* (2013.01); *F03D 17/024* (2023.08); *F03D 7/045* (2013.01);

(Continued)

(58) Field of Classification Search
CPC ............ F05B 2270/333; F05B 2260/96; F03D 7/0296; F03D 17/024
See application file for complete search history.

(56) References Cited

U.S. PATENT DOCUMENTS 9,347,432 B2 *    5/2016    Herrig .................... F03D 7/0296
9,593,668 B2 *    3/2017    Delport ................. F03D 7/0296
(Continued)

FOREIGN PATENT DOCUMENTS

EP            3260700 A1    12/2017
EP            3731158 A1    10/2020

OTHER PUBLICATIONS

European Patent Office, extended European Search Report for Application 22213673.1-1002 dated Oct. 19, 2023.

*Primary Examiner* — Courtney D Heinle
*Assistant Examiner* — Wesley Le Fisher
(74) *Attorney, Agent, or Firm* — Patterson + Sheridan, LLP; Gero G. McClellan

(57) ABSTRACT

Disclosed is a method, performed by an electronic device, for controlling operation of a wind turbine. The method comprises obtaining wind turbine data associated with the wind turbine. The wind turbine data is indicative of conditions of operation of the wind turbine. The method comprises predicting an amplitude modulation (AM) noise parameter indicative of AM noise within a region at a distance from the wind turbine by applying a machine learning model to the wind turbine data. The method comprises generating, based on the AM noise parameter, control data indicative of a control operation of the wind turbine. The method comprises providing the control data to a controller for controlling the wind turbine in accordance with the control data.

14 Claims, 5 Drawing Sheets

(52) U.S. Cl.
CPC .......... *F03D 7/046* (2013.01); *F05B 2260/84*
(2013.01); *F05B 2260/96* (2013.01); *F05B*
*2270/333* (2013.01); *F05B 2270/404* (2013.01)

(56) References Cited

U.S. PATENT DOCUMENTS

| | | | | |
|---|---|---|---|---|
| 9,995,277 | B2 * | 6/2018 | Herrig | F03D 7/045 |
| 10,711,766 | B2 * | 7/2020 | Ambekar | F03D 7/048 |
| 11,313,355 | B2 * | 4/2022 | Nielsen | F03D 17/00 |
| 12,012,935 | B2 * | 6/2024 | Grunnet | F03D 7/0224 |
| 2013/0140818 | A1 * | 6/2013 | Matesanz Gil | F03D 7/048 |
| | | | | 290/44 |
| 2016/0032892 | A1 | 2/2016 | Herrig et al. | |
| 2016/0032893 | A1 * | 2/2016 | Herrig | F03D 17/00 |
| | | | | 290/44 |
| 2016/0032894 | A1 * | 2/2016 | Ambekar | F03D 7/0296 |
| | | | | 416/1 |
| 2016/0341180 | A1 | 11/2016 | Lee | |

* cited by examiner

300

CONTROL OF A WIND TURBINE BASED ON PREDICTING AMPLITUDE MODULATION (AM) NOISE

The present disclosure pertains to the field of wind turbine control. The present disclosure relates to a method for control of operation of a wind turbine and related electronic device.

BACKGROUND

During operation of a wind turbine, noise is generated by the rotation of the rotor blades through air. The noise includes amplitude modulation (AM) noise. The AM noise can be perceived as a "swooshing" or periodic pulsing sound in areas near the wind turbine (e.g., in the near field). Under certain conditions, an AM noise can be heard at a distance from the wind turbine (e.g., in the far field, e.g., locations at a certain distance, e.g., 1-4 or more kilometres away from the wind turbines) as a "thumping" or "flapping" sound. It is of benefit to provide ways of reducing noise generated by wind turbines.

SUMMARY

It is an object of the present invention to improve the ability of predicting AM noise generated by a wind turbine so that it can be controlled and possibly avoided at a distance from the wind turbine.

Accordingly, it would be a benefit to provide an electronic device and a method that may allow prediction of AM noise in wind turbine noise and enable control of a wind turbine to mitigate the AM. Accordingly, it would be a benefit to provide an electronic device and a method for controlling operation of a wind turbine, which mitigates, alleviates or addresses the shortcomings existing and predicts the AM noise so as to control the AM noise, and eventually to reduce the AM noise generated by a wind turbine.

Disclosed is a method, performed by an electronic device, for controlling operation of a wind turbine. The method comprises obtaining wind turbine data associated with the wind turbine. The wind turbine data is indicative of conditions of operation of the wind turbine. The method comprises predicting an AM noise parameter indicative of AM noise within a region at a distance from the wind turbine by applying a machine learning model to the wind turbine data. The method comprises generating, based on the AM noise parameter, control data indicative of a control operation of the wind turbine. The method comprises providing the control data to a controller for controlling the wind turbine in accordance with the control data.

Disclosed is an electronic device comprising a memory circuitry, a processor circuitry, and an interface, wherein the electronic device is configured to perform any of the methods according to the disclosed methods.

Disclosed is a computer readable storage medium storing one or more programs, the one or more programs comprising instructions, which when executed by an electronic device cause the electronic device to perform any of the methods according to the disclosed methods.

It is an advantage of the present disclosure that the disclosed electronic device and method enable a more precise prediction and control of the AM the noise generated by the wind turbine. This may result in an anticipation of the AM noise and a mitigation of the AM noise. The methods, device and wind turbines provide a control scheme that learns and adapts the control operation. Also, the disclosed technique allows identifying wind turbines that are most likely to contribute to the AM wind turbine noise.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
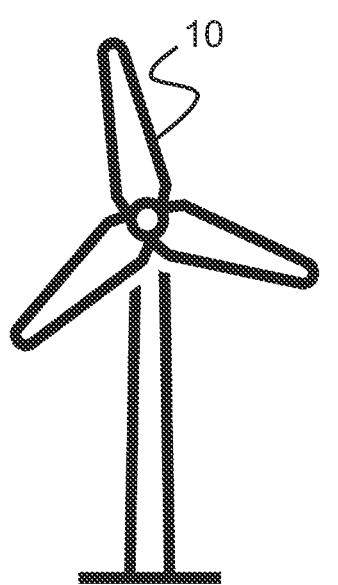
FIG. 1 is a diagram illustrating schematically a wind turbine proximal to houses within hearing range of a wind turbine.
Figure 1:
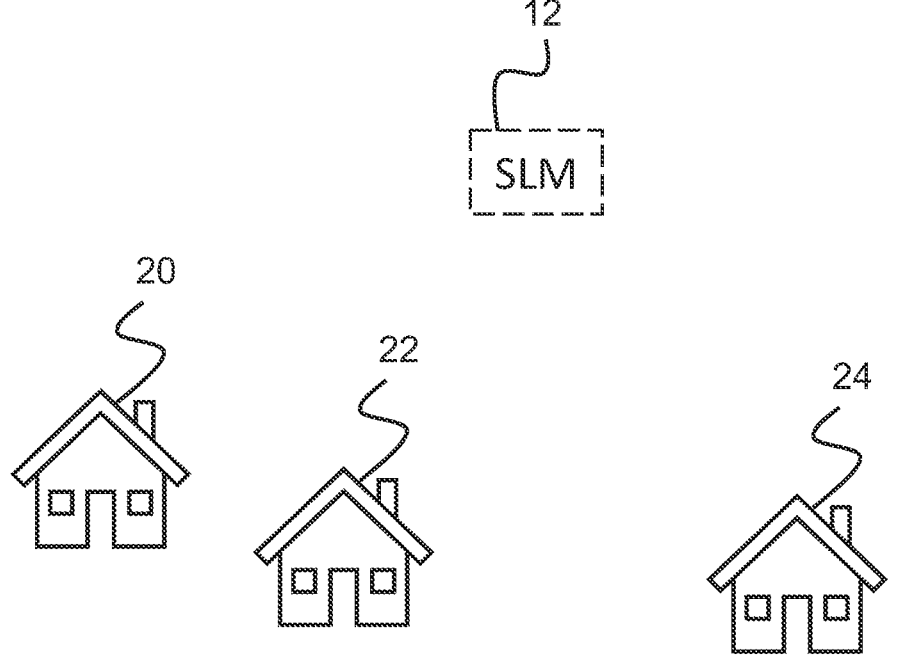

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The observation of the AM noise generated by rotation of blades of a wind turbine is seen as a side effect of the operations of a wind turbine, which is to be mitigated and possibly prevented. For example, a sound level meter (SLM, 12, as illustrated in FIG. 1) is placed at a distance from a wind turbine that may correspond to the distance of the wind turbine to the nearest noise sensitive area (e.g., residential areas). For example, the sound level meter evaluates noise characteristics such as sound pressure levels and evaluates the level of amplitude modulation in the noise in accordance with known standards prediction of AM noise in wind turbine noise, and control of the AM noise based on the prediction, e.g., in order to ensure compliance with noise regulations. The AM noise is predicted based on applying a machine learning (ML) model which can be trained based on historical noise data and wind turbine data associated with a wind turbine and/or a park. For example, the trained ML model is used to predict for future occasions of AM noise and which turbines contribute to which extent to the AM noise generation. The prediction allows control of the AM noise, e.g., by setting a noise mode and/or by adjusting operations of the wind turbine (such as active power). In some examples, the control operation (e.g., degree by which the turbine needs to be curtailed and/or which noise mode) is determined based on observations of the previously achieved reduction in AM noise level. In some examples, the achieved reduction in noise level can be used to refine ranking of the wind turbines to increase the accuracy of the control.

The present disclosure provides a method, performed by an electronic device, for enabling control of operation of a wind turbine and/or for controlling operation of a wind turbine. The disclose method is performed advantageously for mitigating the AM noise.

The disclosed method comprises obtaining wind turbine data associated with the wind turbine. The wind turbine data is indicative of conditions of operation of the wind turbine. In one or more example methods, wind turbine data comprises one or more of: one or more environmental conditions, sensor data, one or more operational parameters, and AM data. Stated differently, the wind turbine data can include data indicative of the environmental conditions. In one or more example methods, the one or more environmental conditions comprise one or more of: a wind speed, a wind direction, a turbulence intensity, a temperature, a precipitation level, and a precipitation type (e.g., rain, snow, hail). Turbulence intensity is for example a value and/or parameter indicative of amount of and/or intensity of turbulence. For example, the wind speed can be obtained e.g., via an anemometer. For example, the turbulence intensity can be obtained based on the wind speed (such as by determining a variance parameter) and/or the wind direction. For example, the turbulence intensity can be determined based on blade load sensor variance data, or other methods. In one or more example methods, the wind turbine comprises a wind vane. The wind direction can be obtained via the wind vane. In one or more example methods, the temperature is obtained via a thermometer of the wind turbine. In one or more example methods, the wind turbine comprises a rain gauge which can provide the electronic device the precipitation level. In one or more example methods, the sensor data is obtained via one or more sensors associated with the wind turbine (such as one or more of: a thermometer, a pressure sensor, a wind sensor, a humidity sensor, a vibration sensor, a position sensor, a rotor speed sensor, a pitch angle sensor, a load sensor, a power meter, a current meter, and a LiDAR, etc.). In one or more example methods, sensor data comprises blade load data (e.g., blade load sensor readings, flap wise load data and/or edge wise load data and/or blade load estimations). For example, the sensor data may include data obtained once per rotation. The sensor data can for example include data obtained continuously and/or periodically over a predefined time constant or period. For examples, the sensor data includes values per rotation or over a predefined time period. In one or more example methods, the one or more operational parameters comprise one or more of: a power information, a rotational speed, a rotor blade pitch, and a nacelle direction. In one or more example methods, the rotor blade pitch is for an individual blades and/or a plurality of blades collectively.

The wind turbine data may be turbine-specific and/or site-specific (e.g., due to form of terrain, elevation and roughness, configuration of a park, and of the wind turbine).

The method comprises predicting an AM noise parameter indicative of AM noise within a region at a distance from the wind turbine by applying a machine learning model to the wind turbine data. In other words, the AM noise parameter is predicted by applying the ML model to the wind turbine data. The ML model can be seen as an AM noise model for a wind turbine. The AM noise parameter indicates and/or quantifies the AM noise generated by the wind turbine in a region and/or area at a distance from the wind turbine (such as residential areas illustrated in FIG. 1). In one or more example methods, the AM noise parameter comprises one or more of: a number of occurrences of AM noise at a determined level for a specified time period and/or a level (e.g., a magnitude and/or an intensity) of AM. For example, the AM noise parameter can be seen as comprising a count indicative of a number of occurrences of AM noise at a determined level for a specified time period. The region when the AM noise is likely be observed based on the disclosed prediction is for example within a predetermined distance from the wind turbine. The AM can be seen as a peak-to-peak variation.

The method comprises generating, based on the AM noise parameter, control data indicative of a control operation of the wind turbine. For example, the control operation comprises adjusting one or more of: a power parameter of the wind turbine, a rotational speed, a rotor blade pitch, a nacelle direction and/or a mode of operation of the wind turbine. The control data can be seen as data allowing to control one or more of: a power parameter of the wind turbine, a rotational speed, a rotor blade pitch, a nacelle direction and/or a mode of operation of the wind turbine. For example, the control data includes one or more control parameters configured to one or more of: a power parameter of the wind turbine, a rotational speed, a rotor blade pitch, a nacelle direction and/or a mode of operation of the wind turbine. In one or more example methods, the power parameter is a parameter for control of the power generated by the generator of the wind turbine. In one or more example methods, the rotational speed provides a speed of rotation per second of one or more blades of the wind turbine. The rotor blade pitch controls the angle of attack of a wind turbine blade. In one or more example methods, the mode of operation is for example a noise mode of the wind turbine.

The method comprises providing the control data to a controller for controlling the wind turbine in accordance with the control data. In one or more example methods, providing the control data to the controller comprises transmitting, to the controller, commands for execution of the control operation of the wind turbine. In one or more example methods, providing the control data to the controller comprises controlling the wind turbine based on the control data. The controller can be a controller internal to the wind turbine and/or a controller external to the wind turbine (e.g., part of a wind park). In some examples, the method can be applied at park level, in that the control data is used by a controller configured to control wind turbines of a park.

In one or more example methods, the AM data comprises data indicative of a current AM value per turbine. In one or more example methods, the AM data comprises historical data indicative of historical AM values per turbine. In one or more example methods, the AM data is obtained in real time (such as obtained quasi real time, continuously and/or currently), e.g., from a remote sound level manager (as illustrated in FIG. 1). In one or more example methods, the historical AM data includes a predefined averaging constant per turbine for one or more wind turbines for a time period. The averaging period may be 10 minutes so that the AM data is data averaged over 10 minutes.

Machine learning may be seen as identifying and/or recognizing patterns in the wind turbine in order to facilitate making predictions for subsequent AM noise parameter. For example, the ML model may be created based on example inputs in order to make valid and reliable predictions for novel inputs and/or outputs. Additionally, or alternatively, the ML model and related machine learning program may be trained by inputting sample AM data sets into the ML program, such as wind turbine data and historical AM values per turbines and/or numerical analysis thereof.

In one or more example methods, the machine-learning model comprises one or more of: a multi-variable linear regression, a neural network, and a decision tree. For example, the machine learning model takes as input the wind turbine data and provides as output a predicted AM noise parameter. The wind turbine data provides variables that are used by the ML model to predict the AM noise parameter, such as the number of occurrences of amplitude modulation in the noise and/or the level of amplitude modulation in the noise. The variables include for example one or more of: one or more environmental conditions, sensor data, one or more operational parameters, and the AM data.

The multi-variable linear regression is for example used to model the relation between the wind turbine data (seen as variables) and the AM noise parameter. For example, the linear regression is used to fit a predictive model to AM noise parameter values and wind turbine data as variables. For example, after developing and training the multi-variable linear regression model, the fitted and/or trained multi-variable linear regression model can be used to make a prediction of the AM noise parameter based on additional wind turbine data variables (e.g., wind turbine data at run time or during execution of the multi-variable linear regression model).

The neural network may be one or more of: a convolutional neural network, and/or a deep neural network. For example, the neural network is characterized by its structure (such as a breadth and/or a depth and/or a type of layers of the machine learning model, and/or a type of machine learning method (e.g., convolutional neural network, deep neural network, and/or convolution kernels if any, features), and/or pre-processing methods). For example, the neural network is characterized by one or more parameters (such as weights and/or coefficients and/or hyper parameters) of the machine learning model are found to be optimal and/or accurate and/or convergent, during training, to predict the AM noise parameter. The neural network may include a plurality of layers including an input layer, one or more hidden layers and an output layer.

The decision tree is for example used as a predictive model to predict the AM noise parameter based on the wind turbine data. For example, the decision tree is a regression tree where the predicted AM noise parameter is provided as an output value.

It may be envisaged that the ML is pre-trained and/or the disclosed method includes training the ML model. In other words, the ML model can be trained offline (e.g., before use) and/or online (e.g., during use). In one or more example methods, the machine learning model is trained using previous wind turbine data and measured AM noise data. It may be envisaged that in some examples, the machine learning model is trained using previous wind turbine data and/or measured AM noise data. For example, the measured AM noise data can be obtained using a sound level meter, such as sound level meter 12 of FIG. 1. The sound level meter can for example be seen as an audio detection device (e.g., a microphone). In one or more example methods, the previous wind turbine data comprises historical wind turbine data. The historical wind turbine data for example comprises historical environmental conditions, historical sensor data, one or more historical operational parameters, and historical AM data. The historical AM data for example comprises historical data indicative of historical AM values per turbine.

The ML mode may be trained using supervised machine learning. In supervised machine learning, processor circuitry of the electronic device described herein may be provided with example inputs of wind turbine data (and/or measured AM noise data) and their associated outputs of AM noise parameter, and may seek to discover a general rule that maps inputs to outputs, so that when subsequent novel inputs of wind turbine data are provided the processor circuitry may, based upon the discovered rule, accurately predict the correct output of AM noise parameter. In one or more examples, machine learning techniques may be used to extract data from input data set, such as wind turbine data. Based on these analyses, the processor circuitry of the electronic device may learn how to identify characteristics and patterns (such as wind turbine data pattern(s) and/or measured AM noise data pattern(s)) that may then be applied to training the ML model and predicting the AM noise parameter disclosed herein.

For example, the trained ML model may be validated by checking the predicted AM noise parameter with measurements. When the ML model is validated and converged with measurements, the electronic device can execute the ML model with no further validations (e.g., comparisons, first and second criteria) needed. For example, when applying the ML model on wind turbine data from another park, the ML model is retrained, revalidated, and then applied directly.

In one or more example methods, the method comprises obtaining a measured AM noise parameter indicative of measured AM noise in the region at a distance from the wind turbine. For example, the measured AM noise parameter can be obtained using a sound level meter. In one or more example methods, the method comprises comparing the measured AM noise parameter and the predicted AM noise parameter. In one or more example methods, the method comprises determining, based on the comparison, a source of the AM noise near the wind turbine. For example, a source of the AM noise may be the wind turbine itself or not (e.g., background noise and/or other sources).

In one or more example methods, obtaining the measured AM noise parameter comprises filtering measurements. In one or more example methods, obtaining the measured AM noise parameter comprises obtaining, based on the filtered measurements, the measured AM noise parameter. In one or more example methods, filtering the measured AM comprises identifying and/or removing outliers from the measurements. For example, the measured AM may be filtered for outliers before being processed. For example, the measurements (such as measured AM noise parameter) can be seen as a raw signal obtained by the one or more sound level meters, or a filtered signal based on the raw signal obtained by the one or more sound level meters. In one or more example methods, the raw signal is filtered using a range filter and/or a distribution.

In one or more example methods, generating, based on the AM noise parameter, the control data comprises determining whether the measured AM noise parameter satisfies a first criterion. For example, determining whether the measured AM noise parameter satisfies a first criterion comprises determining whether the measured AM noise parameter is above a threshold (such as a threshold value, such as 2 dB). In other words, for example, when the measured AM noise parameter is above the threshold, the measured AM noise parameter satisfies the first criterion. For example, when the measured AM noise parameter is not above the threshold, the measured AM noise parameter does not satisfy the first criterion.

In one or more example methods, generating, based on the AM noise parameter, the control data comprises determining whether the comparison between the measured AM noise parameter and the predicted AM noise parameter satisfies a second criterion. For example, the second criterion evaluates how close the predicted AM noise parameter to the measured AM noise parameter. For example, the second criterion evaluates if the difference between the predicted and measured AM noise parameter indicates that one or more wind turbines contribute to the occurrence of AM noise. For example, the comparison can be between the measured AM noise parameters and a sum of the predicted AM noise parameters. For example, when the comparison shows a difference that is above a threshold (such as 2 dB), the second criterion is satisfied by the comparison. For example, when the comparison shows a difference that is not above a threshold (such as 2 dB), the second criterion is not satisfied by the comparison.

In one or more example methods, generating, based on the AM noise parameter, the control data comprises, upon determining that the measured AM noise parameter satisfies the first criterion and that the comparison between the measured AM noise parameter and the predicted AM noise parameter satisfies the second criterion, generating the control data indicating that the control operation is to be triggered. For example, the control data generated indicates that the control operation is to be triggered when the measured AM noise parameter meets the first criterion (e.g., above a predefined threshold) and the comparison between the measured AM noise parameter and the predicted AM noise parameter meets the second criterion (such as when the difference between the predicted and measured amplitude modulation indicates that one or more turbines contribute to the AM noise). In other words, the control operation for mitigating the AM noise can take place when the first and second criterion are met.

In one or more example methods, generating, based on the AM noise parameter, the control data comprises, upon determining that the measured AM noise parameter does not satisfy the first criterion or that the comparison between the measured AM noise parameter and the predicted AM noise parameter does not satisfy the second criterion, generating the control data indicating that the control operation is not to be triggered. For example, the control data generated indicates that the control operation is not to be triggered when the measured AM noise parameter does not meet the first criterion (e.g., not above a predefined threshold) or when the comparison between the measured AM noise parameter and the predicted AM noise parameter does not meet the second criterion (such as when the difference is below 2 dB). In other words, the control operation for mitigating the AM noise cannot take place when the first criterion or the second criterion is not met.

In one or more example methods, the method comprises ranking, based on the comparison, the predicted AM noise parameter. In one or more example methods, generating, based on the AM noise parameter, the control data comprises generating, based on the ranking, the control data. In one or more example methods, the predicted AM noise parameter closest to (e.g., most similar to) the measured AM noise parameter is assigned the highest ranking. For example, the predicted AM noise parameter for each wind turbines are ranked. In one or more example methods, the method comprises, for the one or more wind turbines associated with the highest-ranking predicted AM noise parameter, executing (such as providing control data to the controller of the wind turbine) commands (e.g., instructions) to change the operation of the wind turbine.

In some examples, the method can be applied at park level, in that the control data is used by a controller configured to control wind turbines of a park based on the control data. For example, the ranking can be used by the controller to select one or more wind turbines to control based on the control data, e.g., to control the wind turbines in a selected order or sequence.

In one or more example methods, the method comprises monitoring measurements of AM noise after execution of the control operation. In one or more example methods, the method comprises determining, based on the monitoring, a reduction parameter indicative of a reduction of the AM noise. For example, the monitoring may be performed over a time period (e.g., for 10 minutes), in real-time. In one or more example methods, monitoring measurements of AM noise (e.g., measured AM noise parameter) after execution of the control operation comprises measuring (e.g., by obtaining via the one or more sound level meters) AM noise after execution of the control operation. In one or more example methods, monitoring measurements of AM noise after execution of the control operation comprises checking (e.g., using processor circuitry of the electronic device) AM noise after execution of the control operation. For example, after the wind turbine has been operated according to the disclosed control data, the AM noise is monitored and measured to evaluate the reduction of the AM noise. In other words, after each intervention of a controller, the reduction parameter can be determined to assess to what extent the measured level of amplitude modulation has been reduced (e.g., assessing the delta between before and after the control operation).

In one or more example methods, the method comprises storing reduction data. In one or more example methods, the reduction data comprises one or more of: the control operation, the reduction parameter associated with the control operation, and one or more environmental condition parameters indicative of environmental conditions during execution of the control operation. For example, the reduction parameter associated with the control operation is stored together with information about the degree by which a wind turbine(s) has been curtailed and the conditions during which the control operation was executed. The reduction data is for example stored in a look up table and/or a database, e.g., for later retrieval. For example, the reduction data can be aggregated in turbine specific lookup tables defining the expected reduction parameter for a controller intervention. For example, the reduction data can be provided individually to a database that contains a machine learning module that estimates a turbine specific reduction parameter for a controller intervention.

In one or more example methods, the method comprises scoring the reduction data based on the reduction parameter. For example, the reduction data indicative of the highest reduction of AM noise may be assigned the highest score and/or rank. For example, a larger the reduction parameter, is given a higher scoring. In other words, the wind turbine generating more AM noise would be penalized or not promoted via the ranking.

In one or more example methods, the method comprises updating, based on the reduction data, the ranking of the predicted AM noise parameter. For example, the method comprises updating, based on the reduction data, the highest-ranking predicted AM noise parameter. For example, the reduction data is used to refine the ranking e.g., for future control loops. A ratio of the achieved reduction parameter (e.g., delta) and the required reduction can be evaluated for a specific set of boundary conditions (e.g., conditions established with data gathered). The ratio can be used as a factor that is multiplied with the turbine individual predicted AM noise parameter (e.g., AM noise level). For example, when in the past the control operation (e.g., controller intervention) on a certain turbine was effective, a higher ratio would be yielded and then multiplied with the predicted AM value resulting in a value that is ranked higher compared to a wind turbine that under similar conditions in the past was part of a controller intervention and not yielded the same delta.

In one or more example methods, generating, based on the AM noise parameter, the control data comprises generating, based on the stored reduction data, a target reduction parameter indicative of a target reduction of the AM noise. In one or more example methods, generating, based on the AM noise parameter, the control data comprises including the target reduction parameter in the control data. The target reduction parameter is for example indicative of the degree by which the turbine needs to be curtailed (e.g., the degree of reduction in active power required to achieve the target reduction of AM noise) and/or the noise mode (e.g., mode of operation) to be selected. In one or more example methods, the achieved AM reduction in the noise can be used to update and/or refine the ranking of wind turbines individually and/or collectively to increase the accuracy and/or effectiveness of the control operation. For example, the active power of the wind turbine is adjusted based on the target reduction parameter and/or the gain parameter. For example, the adjustment (such as reduction) of active power of the wind turbine does not need to be an absolute value but may be a percentage of available power. For example, the target reduction parameter may comprise a value indicative of a percentage of available power. Available power can be seen as the possible (such as maximum) active power generation of the wind turbine for a specified wind speed (such as a specified wind field) acting on the rotors of the wind turbine. A value indicative of the available power can for example be obtained by assessing the current operating point of the wind turbine, even if the operating point differs from the operation under which available power would be achieved. In one or more example methods, the achieved AM reduction in the noise can be used to update and/or refine the ranking of wind turbines individually and/or collectively to increase the accuracy and/or effectiveness of the control operation.

In one or more example methods, the method comprises, upon determining that the comparison between the measured AM noise parameter and the predicted AM noise parameter does not satisfy the second criterion, re-training the machine-learning model based on the measured AM noise parameter. For example, when the predicted and measured AM noise parameters are too far from each other, the ML model is retrained using the measured AM noise parameter and optionally the wind turbine data used to generate the predicted AM noise parameter.

The figures are schematic and simplified for clarity, and they merely show details which aid understanding the disclosure, while other details have been left out. Throughout, the same reference numerals are used for identical or corresponding parts.

FIG. 1 is a diagram illustrating a wind turbine that is in proximity to a residential area. The term "residential area" may be seen as a group of at least two residential buildings (such as houses). FIG. 1 shows a wind turbine 10 and a sound level meter 12. A controller may form part of wind turbine 10 or may be external to wind turbine 10. The controller may be seen as a controller configured to control operations of the wind turbine. The figure shows a single wind turbine, but it is to be understood that the present invention equally applies to a group of wind turbines arranged as a wind farm or park, and that the illustrated wind turbine may be a representative wind turbine of a wind farm. Further, FIG. 1 shows a first house 20, a second house 22 and a third house 24. The residential area includes the first house 20, second house 22 and/or third house 24. The residential area and the sound level meter 12 are for example within range of the wind turbine for observing the AM noise. The AM noise may be observed at a distance from the wind turbine 10, possibly in a given direction that may be towards a region including the residential area. The sound level meter 12 can measure the AM noise and provide an AM noise parameter to the disclosed electronic device and/or a controller of the wind turbine 10.

The present disclosure provides methods, devices and wind turbines that enable prediction of AM noise generated by the wind turbine 10, and control of the AM noise based on the prediction. The AM noise is predicted based on applying a machine learning (ML) model. The prediction allows control of the AM noise, e.g., by setting a noise mode and/or by adjusting operations of the wind turbine 10. This may lead to a reduction (possibly prevention) of the AM noise observed at the residential area.

Figure 2A:
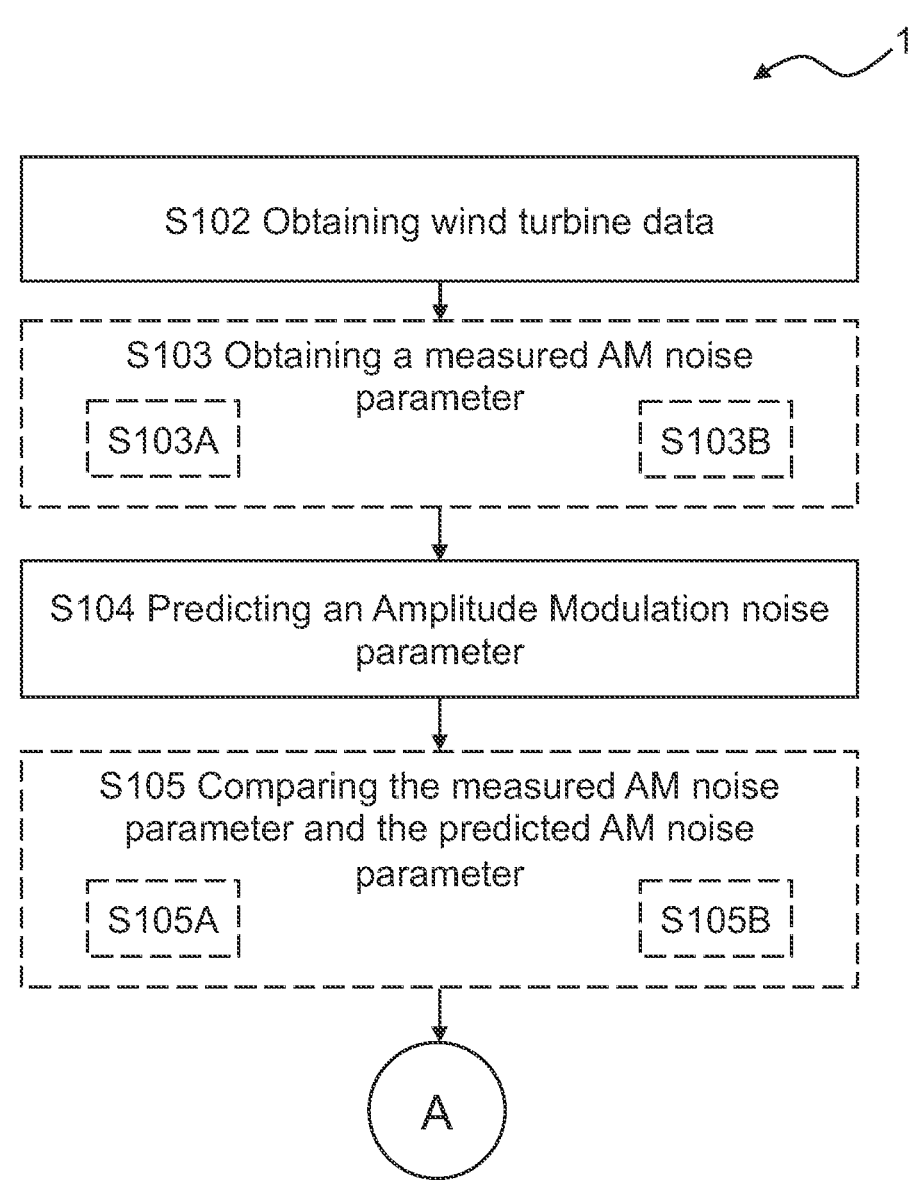
FIGS. 2A-2C is a flow-chart illustrating an exemplary method, performed by an electronic device, for controlling operation of a wind turbine according to this disclosure.
Figure 2B:
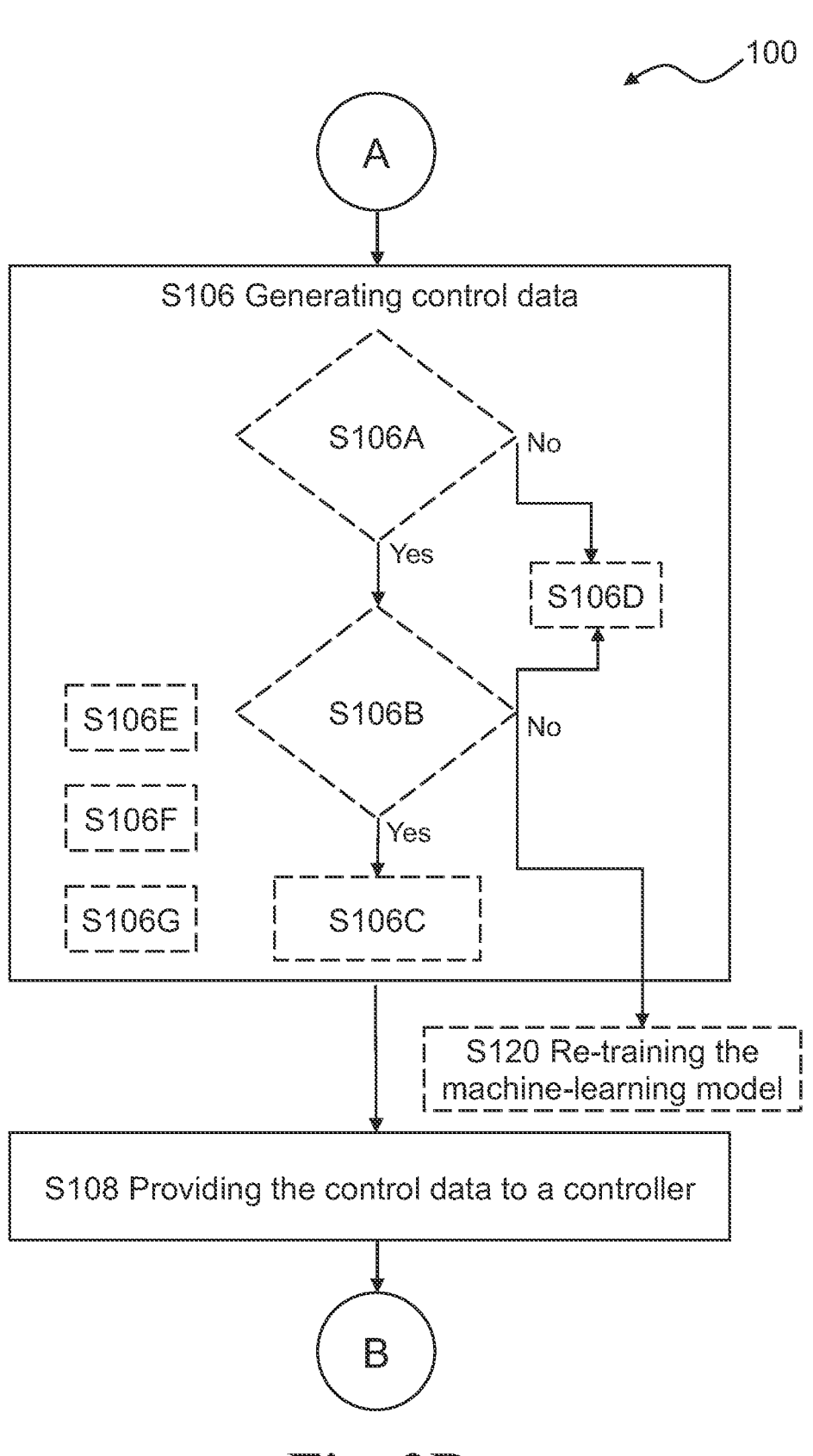
Figure 2C:
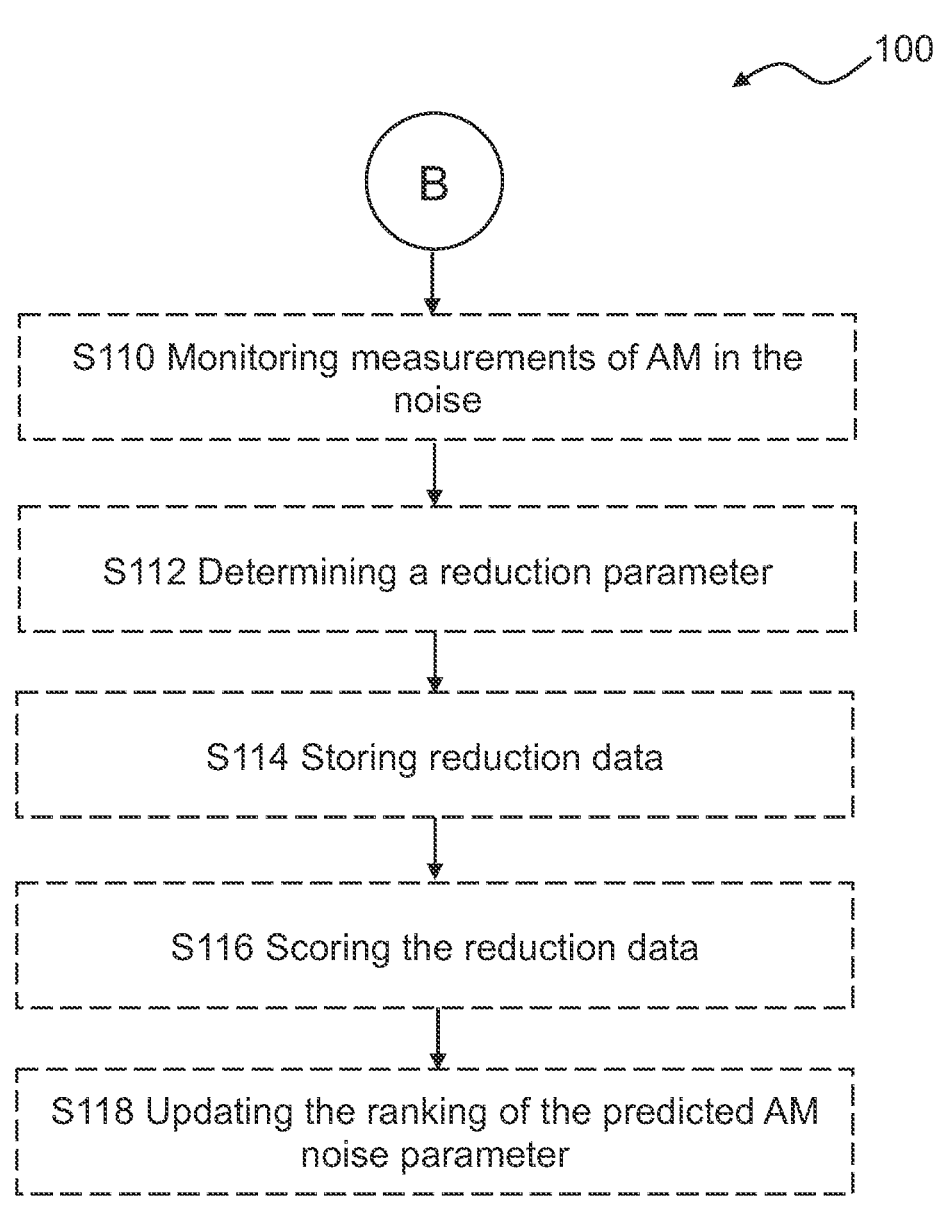

FIGS. 2A-2C show a flow diagram of an example method 100, performed by an electronic device, for enabling control of operation of a wind turbine according to the disclosure. The electronic device is the electronic device disclosed herein, such as electronic device 300 of FIG. 3. The method may be seen as a method for controlling operation of a wind turbine.

With reference to FIG. 2A, the method 100 comprises obtaining S102 wind turbine data associated with the wind turbine. The wind turbine data is indicative of conditions of operation of the wind turbine. For example, the wind turbine data is obtained continuously and/or periodically. In one or more example methods, the wind turbine data comprises information indicative of one or more environmental conditions, sensor data, one or more operational parameters, and AM data. In one or more example methods, the one or more environmental conditions comprise one or more of: a wind speed, a wind direction, a turbulence intensity, a temperature, a precipitation level, and a precipitation type. In one or more example methods, the sensor data comprises blade load data, e.g., from blade load sensors for obtaining edge wise loading data and flap wise loading data. In one or more example methods, the sensor data comprises flap wise loading data and/or edge wise loading data and/or torsional blade loading data. For example, the sensor data may be obtained once per rotation. The sensor data can for example be obtained continuously and/or periodically over a defined time constant.

In one or more example methods, the one or more operational parameters comprise one or more of: a power information, a rotational speed, a rotor blade pitch, and a nacelle direction. In one or more example methods, the one or more operational parameters comprise the rotor blade pitch of individual blades and/or the rotor blade pitch of more than one blade collectively. In one or more examples, the one or more operational parameters include a noise mode (such as a noise mode for controlling the wind turbine to reduce the AM of the wind turbine). For example, a noise mode for reducing AM may be triggering an operational parameter indicative a different rotor blade pitch angle compared to a noise mode not aimed at reducing AM (such as a non-curtailed noise mode). In one or more example methods, the power information comprises information indicative of the active power (such as power output of the wind turbine generator) of the wind turbine. For example, the power information is obtained periodically and/or continuously. The power information for example comprises information indicative of peak power output and/or lowest power output for a specified time period. The rotational speed can be seen as a value indicative of the rotations per unit time of the wind turbine rotor. The one or more operational parameters can be obtained from one or more sensors or components associated with the wind turbine. In one or more example methods, the AM data comprises data indicative of a current AM value per turbine and/or historical data indicative of historical AM values per turbine. In one or more example methods, the current AM value can be obtained in real time (such as obtained quasi real time, continuously and/or currently) from a sound level meter. In one or more example methods, the historical AM values includes values of a defined averaging constant per turbine of one or more wind turbines and can be obtained from a look up table and/or database. In one or more example methods, the AM data comprises data associated with one or more wind turbines. In one or more example methods, the current AM value and the historical AM values are associated with an individual wind turbine.

The method 100 comprises predicting S104 an AM noise parameter indicative of AM noise within a region at a distance from the wind turbine by applying a machine learning model to the wind turbine data. In one or more example methods, the AM noise parameter comprises one or more of: a number of occurrences of AM noise at a determined level for a specified time period and/or a level (e.g., a magnitude and/or intensity) of AM. The region at a distance from the wind turbine is, for example, an area within a predetermined distance of the wind turbine. For example, the region is defined by a 3D and/or a 2D area. The region may comprise the wind turbine. The region may not comprise the wind turbine. The border of the region may be set in accordance with local regulation in relation to allowed noise level. The region can be for example be determined by the electronic device.

With reference to FIG. 2B, the method 100 comprises generating S106, based on the AM noise parameter, control data indicative of a control operation of the wind turbine. In one or more example methods, the control operation comprises adjusting one or more of: a power parameter of the wind turbine, a rotational speed, a rotor blade pitch, a nacelle direction and/or a mode of operation of the wind turbine. In one or more example methods, the power parameter, rotational speed, rotor blade pitch, and/or mode of operation for one or more wind turbines can for example be obtained individually for each wind turbine and/or collectively for a plurality of the one or more wind turbines.

The method 100 comprises providing S108 the control data to a controller for controlling the wind turbine in accordance with the control data. In one or more example methods, the control data comprises information indicative of instructions (such as commands) for operation of the wind turbine. In one or more example methods, providing the control data to the controller comprises transmitting, to the controller, commands (such as control data) for execution of the control operation of the wind turbine. The control operation can be seen as an operation of the wind turbine controlled by control data (e.g., using the controller). In one or more example methods, the control data is transmitted from the electronic device (e.g., via processor circuitry 302 and/or interface 303 of FIG. 3) to a controller (e.g., an internal controller and/or an external controller). In one or more example methods, the method comprises controlling the wind turbine in accordance with the control data, e.g., via a controller of the wind turbine. In some examples, the electronic device can include the controller. In some examples, the controller is external to the electronic device. In one or more example methods, the controller can control operations of a set of wind turbines (e.g., a set of wind turbines of a park) and/or a single wind turbine. In other words, the disclosed method can be applied at park level and/or at wind turbine level.

In one or more example methods, the machine-learning model comprises one or more of: a multi-variable linear regression, a neural network, and a decision tree. In one or more example methods, the ML model runs on processor circuitry of the electronic device and can take as input wind turbine data and can provide the AM noise parameter as the output.

In one or more example methods, the machine learning model is trained using previous wind turbine data and measured AM noise data. For example, the measured AM noise data can be obtained using a sound level meter. In one or more example methods, the sound level meter can be placed at a distance to one or more wind turbines corresponding to the distance of the one or more wind turbines to the nearest noise sensitive area (e.g., residential area). For example, if a residential area is 1 km west from one or more wind turbines, the sound level meter may be placed 1 km south of one or more wind turbines. The sound level meter can for example evaluate, in accordance with known standards, noise characteristics such as sound pressure levels and/or the level of AM. In one or more example methods, the previous wind turbine data comprises historical wind turbine data. The wind turbine data for example comprises historical environmental conditions, historical sensor data, one or more historical operational parameters, and historical AM data. The historical AM data for example comprises data indicative of historical AM values per turbine.

In one or more example methods, the method comprises obtaining S103 a measured AM noise parameter indicative of measured AM noise in the region at a distance the wind turbine. In one or more example methods, the method comprises comparing S105 the measured AM noise parameter and the predicted AM noise parameter. In one or more example methods, the method comprises determining S105A, based on the comparison, a source of the AM noise near the wind turbine. For example, the measured AM noise parameter can be obtained from a sound level meter. In one or more example methods, the source of the AM noise near the wind turbine may be the wind turbine itself for which the wind turbine data is obtained. In one or more example methods, source of the AM noise near the wind turbine may not be the wind turbine (e.g., background noise and/or other sources). In one or more example methods, determining whether the AM source is a wind turbine or background noise and/or other AM sources comprises comparing (e.g., using the processor circuitry 302) the measured AM noise parameter to the predicted AM noise parameter. For example, the method comprises obtaining the measured AM noise parameter using one or more sound level meters. The one or more sound level meters are for example associated with the wind turbine. For example, the one or more sound level meters may be positioned to obtain the measured AM noise parameter (such as a 360-degree representation of the noise) emitted from the wind turbine. In one or more examples, the one or more sound level meters may be positioned to obtain noise data (such as the measured AM noise parameter) for a specified region of which the wind turbine may or may not be in the centre of. The measured AM noise parameter can for example be obtained periodically and/or continuously. The predicted AM noise parameter is for example provided by the machine learning model. In one or more example methods, the method comprises comparing the AM characteristics of each data point of the predicted AM noise parameter (e.g., provided by the machine learning model) and each data point of the measured AM noise parameter (e.g., obtained and/or evaluated by the sound level meter). For example, the sound level meter assigns a time stamp to each data point obtained. For example, the machine-learning model assigns a time stamp to each data point provided. In one or more example methods, the compared data points of the predicted AM noise parameter and the measured AM noise parameter are data points associated with the same and/or closest moment in time.

In one or more example methods, obtaining S103 the measured AM noise parameter comprises filtering S103A measurements. In one or more example methods, obtaining S103 the measured AM noise parameter comprises obtaining S103B, based on the filtered measurements, the measured AM noise parameter. For example, the measured AM may be filtered for outliers prior to obtaining, based on the filtered measurements, the measured AM noise parameter. In one or more example methods, filtering the measured AM comprises identifying and/or removing outliers (such as outlying data points indicative of audio obtained by the sound level meter). For example, the measurements (such as measured AM) prior to filtering can be seen as a raw signal obtained by the one or more sound level meters. For example, the measurements (such as measured AM) after filtering can be seen as a filtered signal based on the raw signal obtained by the one or more sound level meters. In one or more example methods, the raw signal is filtered using a range filter and/or a distribution.

In one or more example methods, generating S106, based on the AM noise parameter, the control data comprises determining S106A whether the measured AM noise parameter satisfies a first criterion. In one or more example methods, the first criterion can be seen as a threshold value. For example, determining whether the measured AM noise parameter satisfies a first criterion comprises determining whether the measured AM noise parameter is above threshold (such as a threshold value, such as 2 dB).

In one or more example methods, generating S106, based on the AM noise parameter, the control data comprises determining S106B whether the comparison between the measured AM noise parameter and the predicted AM noise parameter satisfies a second criterion. In one or more example methods, comparing the measured AM noise parameter and the predicted AM noise parameter comprises determining how closely they match (e.g., how similar the measured AM noise parameter and the predicted AM noise parameter are). In one or more example methods, the second criterion can be seen as a similarity criterion. In other words, if the difference between the measured AM noise parameter and the predicted AM noise parameter is above a specified threshold (e.g., a difference of 2 dB between the measured AM noise parameter and the predicted AM noise parameter), the second criterion may for example be seen as not satisfied.

In one or more example methods, generating S106, based on the AM noise parameter, the control data comprises, upon determining that the measured AM noise parameter satisfies the first criterion and that the comparison between the measured AM noise parameter and the predicted AM noise parameter satisfies the second criterion, generating S106C the control data indicating that the control operation is to be triggered. In one or more example methods, for each data point where the measured AM noise parameter is found to be above a predefined threshold and/or where the difference between the predicted AM noise parameter and measured AM noise parameter indicates that one or more turbines might be contributing to the AM, the control operation takes place.

In one or more example methods, generating S106, based on the AM noise parameter, the control data comprises, upon determining that the measured AM noise parameter does not satisfy the first criterion or that the comparison between the measured AM noise parameter and the predicted AM noise parameter does not satisfy the second criterion, generating S106D the control data indicating that the control operation is not to be triggered.

In one or more example methods, the method comprises ranking S105B, based on the comparison, the predicted AM noise parameter. In one or more example methods, generating S106, based on the AM noise parameter, the control data comprises generating S106E, based on the ranking, the control data. In one or more example methods, the predicted AM noise parameter closest to (e.g., most similar to) the measured AM noise parameter is assigned (e.g., using the processor circuitry 302 of FIG. 3) the highest ranking. In one or more example methods, the method comprises, for the one or more wind turbines associated with the highest-ranking predicted AM noise parameter, executing (such as providing control data to the controller of the one or more wind turbines) commands (e.g., instructions) for operation of the wind turbine. In one or more example methods, the method comprises providing control data to the one or more controller associated with the one or more wind turbines with the highest ranked predicted AM noise parameter. In one or more example methods, the method comprises executing control data such as to change the operational parameters of the one or more wind turbines with the highest ranked predicted AM noise parameter.

With reference to FIG. 2C, in one or more example methods, the method comprises monitoring S110 measurements of AM noise after execution of the control operation. In one or more example methods, the method comprises determining S112, based on the monitoring, a reduction parameter indicative of a reduction of the AM noise. In one or more example methods, monitoring measurements of AM noise after execution of the control operation comprises obtaining, via the one or more sound level meters, AM noise after execution of the control operation. In one or more example methods, monitoring measurements of AM noise after execution of the control operation comprises checking (e.g., using processor circuitry 302 of FIG. 3) AM noise after execution of the control operation. In one or more example methods, the reduction parameter can be seen as a delta indicative of the difference in measured AM noise parameter before and after execution of the control operation (which results in a reduction). A control operation can for example be seen as a controller intervention.

In one or more example methods, the method comprises storing S114 reduction data. In one or more example methods, the reduction data comprises one or more of: the control operation, the reduction parameter associated with the control operation, and one or more environmental condition parameters indicative of environmental conditions during execution of the control operation. The reduction data is for example stored such as to enable it to be looked up in a table and/or a database. In one or more example methods, the reduction data can be stored in turbine specific lookup tables and/or turbine specific databases. The turbine specific lookup tables and/or turbine specific databases for example comprise a prediction of the expected delta for a certain control operation based on the reduction data. In one or more example methods, the reduction data may be provided to a database containing a machine learning model configured to estimate turbine specific reduction parameters (such as turbine specific deltas) for specific controller operations.

In one or more example methods, the method comprises scoring S116 the reduction data based on the reduction parameter. For example, the reduction data indicative of the highest reduction of AM noise may be assigned the highest score and/or rank.

In one or more example methods, the method comprises updating S118, based on the reduction data, the ranking of the predicted AM noise parameter. For example, the method comprises updating, based on the reduction data, the highest ranking predicted AM noise parameter. In one or more example methods, the ranking of the predicted AM noise parameter is used to refine and/or optimize the ranking for future control loops carried out by the machine learning model. In one or more example methods, the ratio of the achieved reduction parameter and the target reduction can be evaluated and/or obtained for a specific set of boundary conditions. The ratio of the achieved reduction parameter and the required reduction can be used as a factor multiplied with the turbine specific predicted AM noise parameter. For example, if the reduction data is indicative of the execution of the control operation causing a high reduction of AM noise (e.g., a high delta), the ratio of the achieved reduction parameter and the required reduction would be higher. The ratio may be multiplied with the predicted AM noise parameter resulting in a higher ranking value than for example a wind turbine that, under similar environmental conditions, executed a control operation resulting in a lesser reduction of AM noise (e.g., a small delta).

In one or more example methods, generating S106, based on the AM noise parameter, the control data comprises generating S106F, based on the stored reduction data, a target reduction parameter indicative of a target reduction of the AM noise. In one or more example methods, generating S106, based on the AM noise parameter, the control data comprises including S106G the target reduction parameter in the control data. In one or more example methods, the target reduction parameter (such as a setpoint) is indicative of the required (such as the target) reduction of AM. The target reduction parameter is for example indicative of the degree by which the turbine needs to be curtailed (e.g., the adjusting the active power of a wind turbine required to achieve the target reduction of AM) and/or the noise mode to be selected. In other words, the active power and/or the noise mode can be set (such as updated) based on the target reduction parameter. In one or more example methods, the noise mode associated with the target reduction parameter is determined using a lookup table and/or the reduction parameter associated with the specific noise mode of a specific turbine under specific environmental conditions. In one or more example methods, the active power of the wind turbine is adjusted based on the target reduction parameter and/or the gain parameter. In one or more example methods, the adjustment (such as reduction) of active power of the wind turbine is a percentage of available power. For example, the target reduction parameter may comprise a value indicative of a percentage of available power. Available power can be seen as the possible (such as maximum) active power generation of the wind turbine for a specified wind speed (such as a specified wind field) acting on the rotors of the wind turbine. A value indicative of the available power can for example be obtained by assessing the current operating point of the wind turbine, even if the operating point differs from the operation under which available power would be achieved. In one or more example methods, the achieved AM reduction in the noise can be used to update and/or refine the ranking of wind turbines individually and/or collectively to increase the accuracy and/or effectiveness of the control operation.

In one or more example methods, the method comprises, upon determining that the comparison between the measured AM noise parameter and the predicted AM noise parameter does not satisfy the second criterion, re-training S120 the machine-learning model based on the measured AM noise parameter, and optionally additional wind turbine data.

Figure 3:
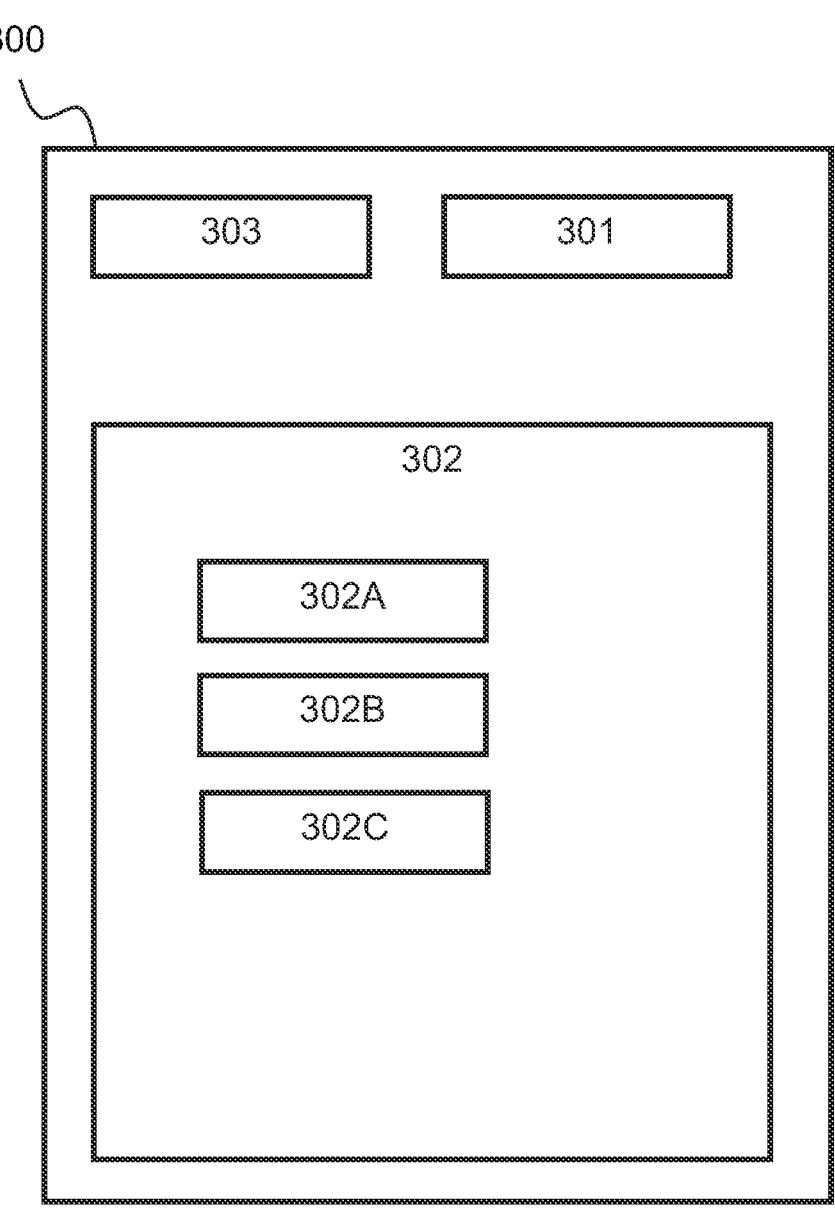
FIG. 3 is a block diagram illustrating an exemplary electronic device according to this disclosure.

FIG. 3 shows a block diagram of an exemplary electronic device 300 according to the disclosure. The electronic device 300 comprises memory circuitry 301, processor circuitry 302, and an interface 303. The electronic device 300 is configured to perform any of the methods disclosed in FIG. 2. In other words, the electronic device 300 is configured for enabling control of operation of a wind turbine, such as for controlling operation of a wind turbine. For example, the electronic device 300 may be a controller of a wind turbine, such as an internal controller of the wind turbine. For example, the electronic device may be a device remote from the wind turbine. For example, the electronic device may be an external controller of the wind turbine.

The electronic device 300 is configured to obtain (e.g., via processor circuitry 302 and/or interface 303) wind turbine data associated with the wind turbine. The wind turbine data is indicative of conditions of operation of the wind turbine.

The electronic device 300 is configured to predict (e.g., via processor circuitry 302) an AM noise parameter indicative of AM noise within a region at a distance from the wind turbine by applying a machine learning model to the wind turbine data. For example, the processor circuitry 302 comprises a predictor logic 302A for predicting the AM noise parameter.

The electronic device 300 is configured to generate (e.g., via processor circuitry 302), based on the AM noise parameter, control data indicative of a control operation of the wind turbine. For example, the processor circuitry 302 comprises an AM controller logic 302B for providing control data.

The electronic device 300 is configured to provide (e.g., via processor circuitry 302 and/or interface 303) the control data to a controller for controlling the wind turbine in accordance with the control data.

For example, the processor circuitry 302 comprises a logic 302B for controlling the target reduction of AM noise.

The processor circuitry 302 is optionally configured to perform any of the operations disclosed in FIG. 2 (such as any one or more of: S102, S103, S103A, S103B, S104, S105, S105A, S105B, S106, S106A, S106B, S106C, S106D, S106E, S106F, S106G, S108, S110, S112, S114, S116, S118, S120). The operations of the electronic device 300 may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 3). The memory circuitry 301 is considered a non-transitory computer readable medium.

The memory circuitry 301 may be configured to store wind turbine data, environmental conditions, operational parameters, noise parameters (such as AM noise parameters), noise data (such as AM noise data), trained ML model parameters and control data in a part of the memory.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by an electronic device, for enabling control of operation of a wind turbine, the method comprising:

obtaining wind turbine data associated with the wind turbine, wherein the wind turbine data is indicative of conditions of operation of the wind turbine;

obtaining a measured Amplitude Modulation (AM) noise parameter indicative of measured AM noise in a region at a distance from the wind turbine;

predicting an AM noise parameter indicative of AM noise within the region at the distance from the wind turbine by applying a machine learning model to the wind turbine data;

comparing the measured AM noise parameter and the predicted AM noise parameter;

determining, based on the comparison between the measured AM noise parameter and the predicted AM noise parameter, a source of the AM noise near the wind turbine;

generating, based on the AM noise parameter, control data indicative of a control operation of the wind turbine, wherein the control data comprises:

determining whether the measured AM noise parameter exceeds a first threshold;

determining whether the comparison between the measured AM noise parameter and the predicted AM noise parameter satisfies a second threshold; and only after determining that the measured AM noise parameter exceeds the first threshold and that the comparison between the measured AM noise parameter and the predicted AM noise parameter satisfies the second threshold, generating the control data indicating that the control operation is to be triggered; and controlling the wind turbine in accordance with the control data.

2. The method according to claim 1, wherein the machine learning model is trained using previous wind turbine data and measured AM noise data.

3. The method according to claim 1, wherein obtaining the measured AM noise parameter comprises:

filtering measurements; and obtaining, based on the filtered measurements, the measured AM noise parameter.

4. The method according to claim 1, wherein generating, based on the AM noise parameter, the control data comprises:

upon determining that the measured AM noise parameter does not exceed the first threshold or that the comparison between the measured AM noise parameter and the predicted AM noise parameter does not satisfy the second threshold, generating the control data indicating that the control operation is not to be triggered.

5. The method according to claim 1, the method comprising ranking, based on the comparison, the predicted AM noise parameter; wherein generating, based on the AM noise parameter, the control data comprises:

generating, based on the ranking, the control data.

6. The method according to claim 5, the method comprising:

monitoring measurements of AM noise after execution of the control operation; and determining, based on the monitoring, a reduction parameter indicative of a reduction of the AM noise.

7. The method according to claim 6, comprising storing reduction data, wherein the reduction data comprises one or more of: the control operation, the reduction parameter associated with the control operation, and one or more environmental condition parameters indicative of environmental conditions during execution of the control operation.

8. The method according to claim 7, comprising scoring the reduction data based on the reduction parameter.

9. The method according to claim 7 comprising updating, based on the reduction data, the ranking of the predicted AM noise parameter.

10. The method according to claim 7, wherein generating, based on the AM noise parameter, the control data comprises:

generating, based on the stored reduction data, a target reduction parameter indicative of a target reduction of the AM noise; and including the target reduction parameter in the control data.

11. The method according to claim 1 comprising:

upon determining that the comparison between the measured AM noise parameter and the predicted AM noise parameter does not satisfy the second threshold, retraining the machine learning model based on the measured AM noise parameter.

12. An electronic device configured to perform an operation controlling a wind turbine, the operation comprising:

obtaining wind turbine data associated with the wind turbine, wherein the wind turbine data is indicative of conditions of operation of the wind turbine;

obtaining a measured Amplitude Modulation (AM) noise parameter indicative of measured AM noise in a region at a distance from the wind turbine;

predicting an AM noise parameter indicative of AM noise within the region at the distance from the wind turbine by applying a machine learning model to the wind turbine data;

comparing the measured AM noise parameter and the predicted AM noise parameter;

determining, based on the comparison between the measured AM noise parameter and the predicted AM noise parameter, a source of the AM noise near the wind turbine;

generating, based on the AM noise parameter, control data indicative of a control operation of the wind turbine, wherein the control data comprises:

determining whether the measured AM noise parameter exceeds a first threshold;

determining whether the comparison between the measured AM noise parameter and the predicted AM noise parameter satisfies a second threshold; and only after determining that the measured AM noise parameter exceeds the first threshold and that the comparison between the measured AM noise parameter and the predicted AM noise parameter satisfies the second threshold, generating the control data indicating that the control operation is to be triggered; and controlling the wind turbine in accordance with the control data.

13. A wind turbine system, comprising:

a tower;

a nacelle disposed on the tower;

a rotor extending from the nacelle and having a plurality of blades at one end thereof; and an electronic device configured to control an operation, comprising:

obtaining wind turbine data associated with the wind turbine system, wherein the wind turbine data is indicative of conditions of operation of the wind turbine system;

obtaining a measured Amplitude Modulation (AM) noise parameter indicative of measured AM noise in a region at a distance from the wind turbine system;

predicting an AM noise parameter indicative of AM noise within the region at the distance from the wind turbine system by applying a machine learning model to the wind turbine data;

comparing the measured AM noise parameter and the predicted AM noise parameter;

determining, based on the comparison between the measured AM noise parameter and the predicted AM noise parameter, a source of the AM noise near the wind turbine system;

generating, based on the AM noise parameter, control data indicative of a control operation of the wind turbine system, wherein the control data comprises:

determining whether the measured AM noise parameter exceeds a first threshold;

determining whether the comparison between the measured AM noise parameter and the predicted AM noise parameter satisfies a second threshold; and only after determining that the measured AM noise parameter exceeds the first threshold and that the comparison between the measured AM noise parameter and the predicted AM noise parameter satisfies the second threshold, generating the control data indicating that the control operation is to be triggered; and controlling the wind turbine system in accordance with the control data.

14. A computer readable storage medium storing one or more programs, the one or more programs comprising instructions, which when executed on any combination of one or more processors, carry out an operation controlling a wind turbine, the operation comprising:

obtaining wind turbine data associated with the wind turbine, wherein the wind turbine data is indicative of conditions of operation of the wind turbine;

obtaining a measured Amplitude Modulation (AM) noise parameter indicative of measured AM noise in a region at a distance from the wind turbine;

predicting an AM noise parameter indicative of AM noise within the region at the distance from the wind turbine by applying a machine learning model to the wind turbine data;

comparing the measured AM noise parameter and the predicted AM noise parameter;

determining, based on the comparison between the measured AM noise parameter and the predicted AM noise parameter, a source of the AM noise near the wind turbine;

generating, based on the AM noise parameter, control data indicative of a control operation of the wind turbine, wherein the control data comprises:

determining whether the measured AM noise parameter exceeds a first threshold;

determining whether the comparison between the measured AM noise parameter and the predicted AM noise parameter satisfies a second threshold; and only after determining that the measured AM noise parameter exceeds the first threshold and that the comparison between the measured AM noise parameter and the predicted AM noise parameter satisfies the second threshold, generating the control data indicating that the control operation is to be triggered; and controlling the wind turbine in accordance with the control data.

* * * * *